Sept. 19, 1961 E. RACKEL 3,000,340
METHOD OF MAKING A WELDED TRAILER TANK
Original Filed Feb. 3, 1956

INVENTOR.
Ernest Rackel.
BY
Harness, Dickey & Pierce
ATTORNEYS.

Sept. 19, 1961            E. RACKEL            3,000,340
METHOD OF MAKING A WELDED TRAILER TANK
Original Filed Feb. 3, 1956            3 Sheets-Sheet 2
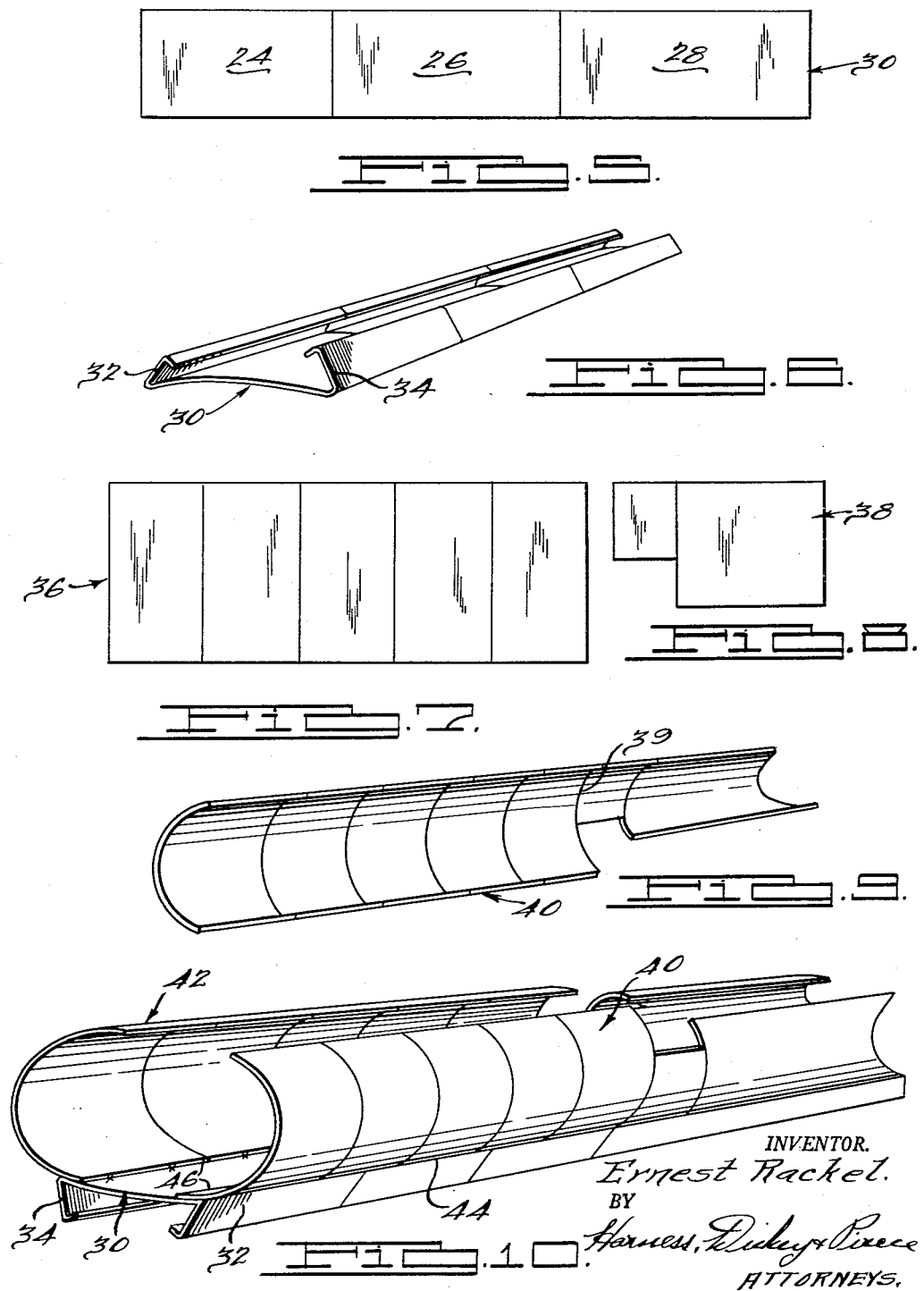
INVENTOR.
Ernest Rackel.
BY
Harness, Dickey & Pierce
ATTORNEYS.

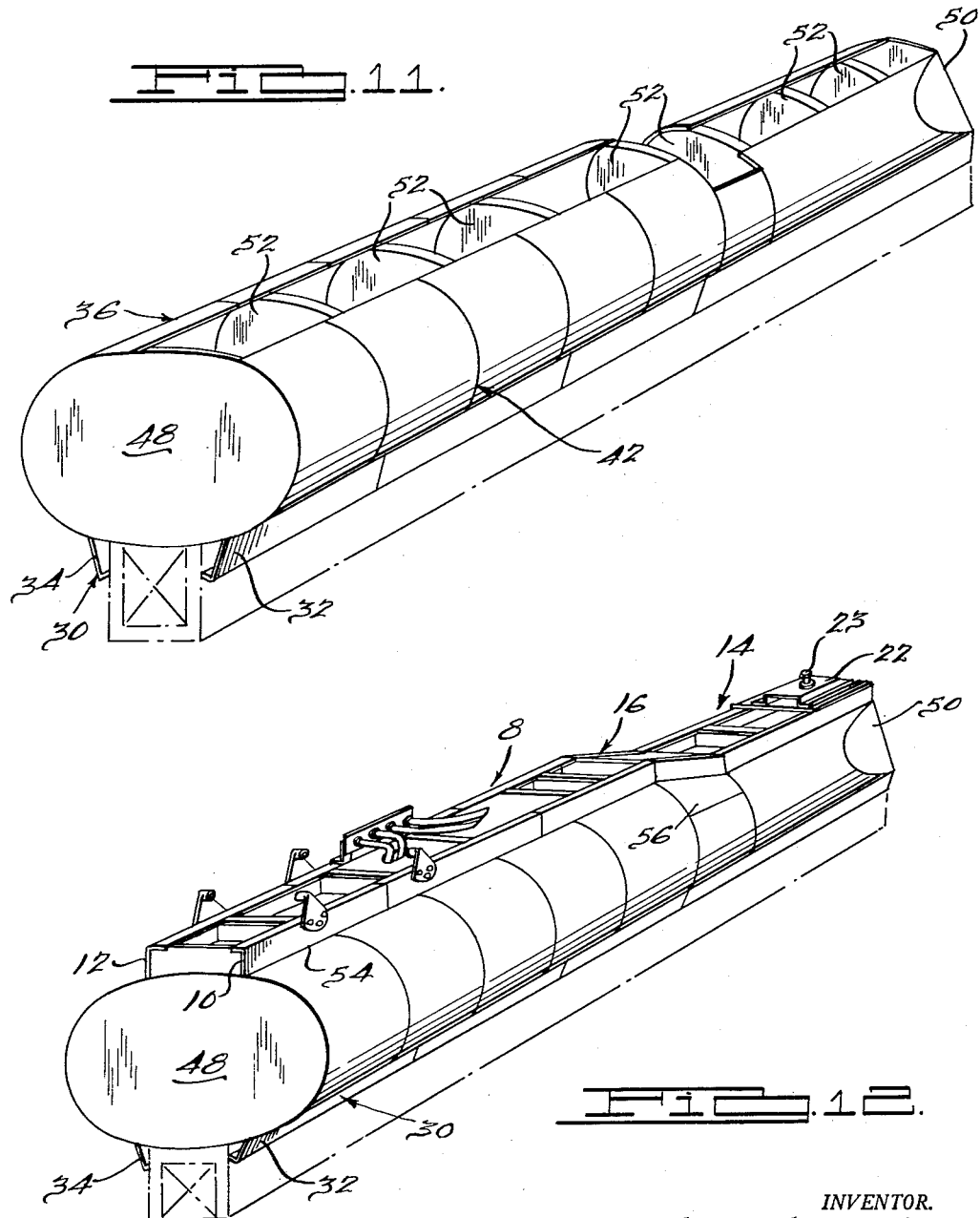

United States Patent Office 3,000,340
Patented Sept. 19, 1961

3,000,340
METHOD OF MAKING A WELDED TRAILER TANK
Ernest Rackel, Fort Wayne, Ind., assignor to Fruehauf Trailer Company, Detroit, Mich., a corporation of Michigan
Original application Feb. 3, 1956, Ser. No. 563,298. Divided and this application Jan. 5, 1959, Ser. No. 785,551
4 Claims. (Cl. 113—120)

This application is a division of my copending application Serial No. 563,298, filed February 3, 1956, now abandoned.

This invention relates to improved tank constructions, and more particularly, but not necessarily exclusively, to an improved method of making a vehicular tank trailer.

According to presently accepted practice, tanks of tank trailers are made up of welded-together shaped steel plates. Usually, construction is started by building up the top portion of the tank in an upside down position and attaching end bulkheads to it to form a large bathtub-like vessel. Baffles and intermediate bulkheads are set in the vessel at desired positions, and finally steel sheets are placed over the assembly to form the bottom portion of the tank. At this stage the assembly is quite strong and rigid. When the bottom sheets are welded in place, they are, therefore, rigidly held and are not free to move to relieve the shrinking forces produced by the welding. Unsightly buckles and bulges along the sides of the tanks often result from the final welding marring the appearance of the tank and also weakening it structurally.

Another difficulty with present practice is the extensive use of manual welding in the fabrication of tanks. Manual welding is not only more expensive than automatic types, but also is apt to be less uniform and more subject to failure. Manual welding is extensively used, however, because many of the welds on a trailer tank are along curved lines that vary from tank to tank. The shapes and contours of these tanks are so infinitely varied that tank manufacturers seldom make a sufficient number of identical tanks to justify the cost of setting up automatic welding jigs to lay down welds along the curved lines.

A further problem constantly encountered in tank trailer manufacture is that of reducing the weight of the trailer without reducing its strength.

One object of the instant invention is to improve tank trailer construction. Another object is to provide tank vehicles of improved appearance, strength and uniformity. Another object is to provide improved methods of making tanks with curved wall portions using a minimum of hand welding.

These and other objects are accomplished by the instant invention according to which a curved wall tank is made of flat sheets welded together to form flat blanks. These blanks are then bent to desired shapes and welded together to form a tank enclosure. The principal welds are all made along straight lines so that automatic welding machinery can be used to produce uniform welds and to minimize warping. The major welds of the final assembly are made in corners so that the weld metal mounds are concealed and do not mar the appearance of the finished tank. The top and bottom wall sections may be flanged before they are assembled in the tank structure to provide catwalk guard and suspension support rails integral with the tank. Also, many auxiliary parts such as valves, piping and sumps may be assembled on the blanks before the final assembly is welded together. Additionally, the top and bottom wall sections can be standardized in width, variations in tank shape and capacity being accomplished by varying the shape of the sides, thus facilitating automatic welding of the final assembly.

The invention will be described in greater detail in connection with the accompanying drawings of which:

FIG. 5 is a plan view of a blank used to form a top wall portion of a tank trailer according to the invention;

FIG. 6 is a perspective view of the blank shown in FIG. 5 after it has been bent into shape to form the top wall portion of the tank trailer;

FIG. 7 is a plan view of a blank to be used to form the rear portion of a tank trailer side wall;

FIG. 8 is a plan view of a blank used to form the front or nose portion of a tank trailer side wall;

FIG. 9 is a perspective view of a complete side assembly showing the blanks of FIGS. 7 and 8 after they have been bent to shape and welded together;

FIG. 10 is a perspective view of a partially assembled tank trailer according to the invention;

FIG. 11 is a perspective view of a partially assembled tank trailer according to the invention, being the same assembly as shown in FIG. 10 but including bulkheads and baffles;

FIG. 12 is a perspective view of a substantially completed tank trailer according to the invention after assembly of the bottom wall portion upon the sides.

Figure 1:
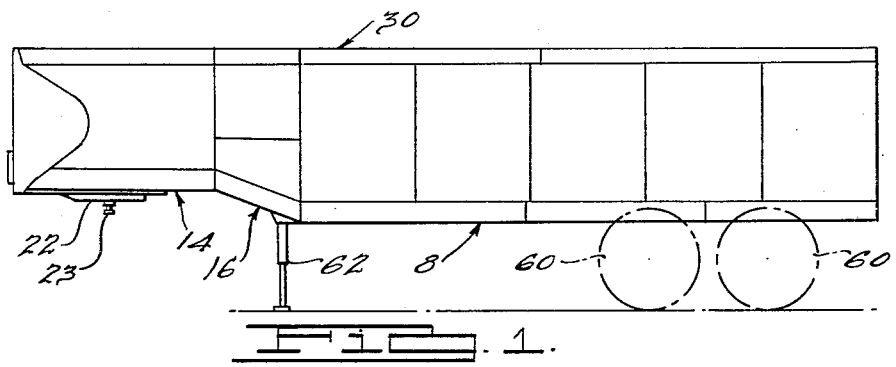
FIGURE 1 is a side elevational view of a complete vehicular tank trailer embodying the invention.
Figure 2:
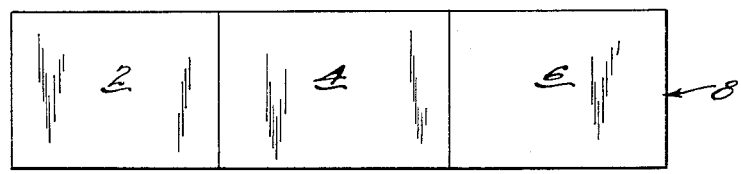
FIG. 2 is a plan view of a blank used to form a bottom wall section of a tank trailer according to the invention.
Figure 3:
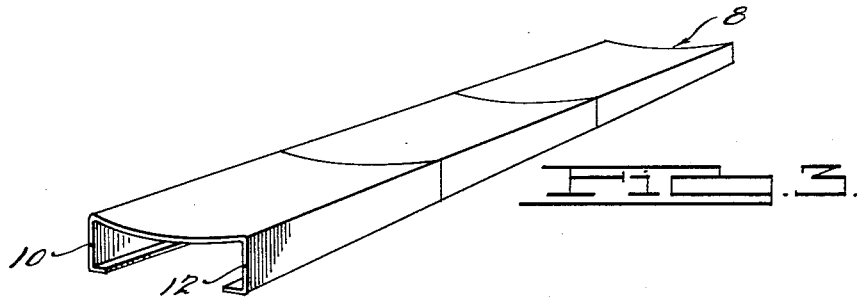
FIG. 3 is a perspective view of the blank shown in FIG. 2 after it has been bent into shape.
Figure 4:
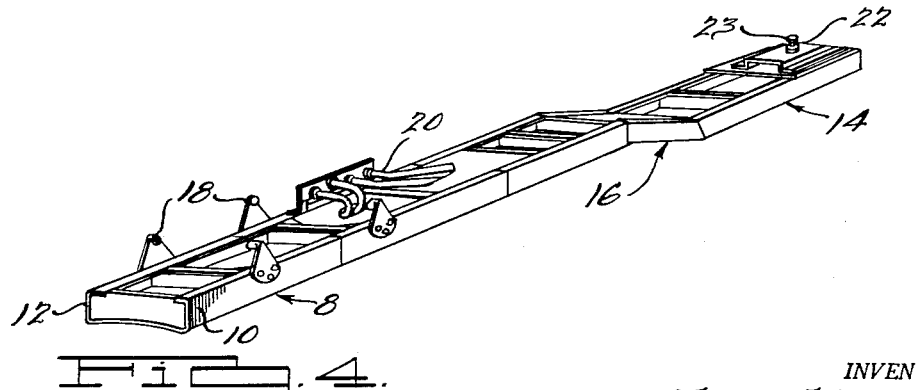
FIG. 4 is a perspective view of the bent blank shown in FIG. 3 in an inverted position and with auxiliary parts added to it to form a complete assembly for the bottom wall portion of a tank trailer according to the invention.

A preferred embodiment of the present invention is represented by a vehicular tank trailer, shown generally in FIG. 1, and made of welded-together steel sheets. In order to provide maximum strength in the finished trailer, the sheets are preferably of high tensile steel, which is commercially available as sheets having a maximum width of only about 66 inches. As shown in FIG. 2, several of such sheets 2, 4 and 6 are welded together end-to-end, preferably by submerged arc welding, to form a relatively large blank 8 for the rear bottom portion of the tank. Since the sheets are flat, automatic welding equipment may be utilized to form these welds and the individual sheets are free to move after welding to relieve strains. Slag is removed from the welds and excess weld metal is ground off to form a flat, smooth blank. The blank is then rolled to a desired curved shape corresponding to the shape of the center portion of the tank bottom and its edges are folded over to form integral rails 10 and 12 along the length of the blank, as shown in FIG. 3. A second section 14, similar to the section 8 but shorter in length, is made in an exactly similar manner to the section 8 to form the forward bottom portion 14 of the tank. The forward portion 14, a bottom mid-section 16 and the rear bottom portion 8 are welded together, end-to-end, to complete the bottom tank wall. Auxiliary parts such as wheel mounting brackets 18, piping 20 and the upper coupler assembly, including a mounting plate 22 and kingpin 23, are then attached to the bottom tank wall before it is fitted to the other wall portions of the tank.

Referring now to FIG. 5, three additional sheets of flat high tensile steel 24, 26 and 28 are welded together to form a flat blank 30 for the top wall of the tank. The blank 30 may be treated in substantially the same manner as the blank 8. It is first scaled and ground to remove slag and excess weld metal. It is then bent to a desired curvature for the top wall of the tank and broken at its edges to form integral catwalk guard rails 32 and 34.

The side sections of the tank are made from two separate blanks 36 and 38, each made up of individual flat sheets welded together in a similar fashion to the blanks 8, 14 and 30, as heretofore described. The blank 36 is bent to form the main rear side wall of the tank. The blank 38 is bent to form the nose and throat side walls of the tank and the two blanks 36 and 38 are welded together along the line 39, as shown in FIG. 9, to form a complete side wall section 40. This weld 39 is preferably done by a portable submerged arc welding process to provide maximum strength in the finished tank. A second matching blank 42 is formed in an exactly similar manner to the blank 40 to form the opposite side wall 42 of the tank.

The shaped sections are then ready for assembly. The top section 30 is inverted and the two side sections 40 and 42 are placed in position with their edges abutting the section 30. The side sections 40 and 42 are then welded, preferably by automatic submerged arc welding equipment, to the top section 30 along the lines 44 and 46. These welds, like most of the preceding ones, are along straight lines to facilitate the use of automatic welding equipment in forming them.

Referring now to FIG. 11, end bulkheads 48 and 50 and internal baffles 52 are arc welded in place in the assembly to the top section 30 and the two side members 36 and 42. The bottom section, consisting of the three longitudinal members 8, 14 and 16, is then placed over the partially completed tank and welded in place along the lines 54, again preferably by automatic submerged arc welding equipment. Finishing gussets 56 are welded in place in the tapering throat section of the tank, one at each side, to complete the tank enclosure. Subsequently, the welding of the bulkheads 48 and 50 and the baffles 52 is completed by hand. Wheels 60 together with any conventional suspension means and a front jack 62 may then be attached to the bottom of the tank to complete the assembly.

The catwalk rails 32 and 34 serve three functions. First, they form a catwalk on the top of the trailer for access to manholes, ports and equipment that may be carried thereon. Second, they provide overturn protection in the event of an accident, and third, but probably most important, they form the structure rail for the compression side of the tank. When the tank is loaded, it is stressed and acts as a structural beam with the top portion being under compression and the bottom portion under tension. The catwalk rails 32 and 34 reinforce the top, compression side of the tank to prevent buckling and excessive bending. The lower flanges 10 and 12 form mounting means for the wheels and other parts of the trailer carried beneath the tank, such as piping, manifolds, valves and the upper couplers 22 and 23. The lower rails 10 and 12 also bear a major part of the tension stress in the tank, reinforcing the bottom of the tank against the tension produced by its load.

It will thus be seen that most of the welding in a tank trailer according to the invention may be done by automatic equipment set up to weld only along straight lines. Further, many of the relatively short welds of the type that produce buckling in previous constructions are made in the flat before the individual sheet members are rigidly positioned so that the members are free to move to relieve stresses created by the welding. Automatic welding of the final shell assembly is facilitated by standardizing the size and shape of the top and bottom portions of the tanks. Thus, automatic welding equipment may be permanently set up to assemble tanks of widely varying sizes and shapes, the variations being limited to the side wall portions of the tanks.

Another feature of the invention is the provision of catwalk and bottom rails integral with the tank shell. This construction reduces the over-all weight of the trailer at no sacrifice in strength. The catwalk rails replace channel members that were formerly used, and the bottom rails replace the complete, relatively heavy subframe, or chassis assembly of previous trailers. Stresses and strains that formerly were encountered between the tank shell and the chassis are eliminated since the wheels are sprung directly from the lower shell members.

While the invention has been described with reference to a tank trailer, such as may be drawn by a conventional tractor, it will readily be seen that it is also applicable to other tank structures such as, for example, self-propelled tank vehicles. In general, the practice of the invention is advantageous in the manufacture of all relatively large welded metal tanks that have curved wall sections.

What is claimed is:

1. Method of making a complete generally cylindrical curved sheet metal wall tank comprising the steps of assembling together relatively small area rectangular flat sheets of metal in co-planar relation with adjacent edges in butting engagement, then joining the edges of said flat sheets by straight line submerged arc welding to form a plurality of relatively large area flat sheet metal blanks, bending said blanks to form portions of said cylindrical curved wall, and welding said blanks together with straight line welds to form the completed cylindrical curved wall whereby the cylindrical tank is formed from a plurality of small flat sheets by straight line welds without having to weld curved edges.

2. Method of making a complete generally cylindrical curved sheet metal wall tank comprising the steps of assembling together relatively small area rectangular flat sheets of metal in co-planar relation with adjacent edges in butting relationship, then joining the edges of said flat sheets by straight line submerged arc welding to form a plurality of relatively large area flat sheet metal blanks, bending said blanks to form portions of said cylindrical curved wall, one of said portions forming a top wall of said tank, a second one of said portions forming a bottom wall of said tank, third and fourth ones of said portions forming separate side walls of said tank, positioning said side walls in abutting relationship to opposite edges of said top wall, welding said side wall to said top wall with straight line welds, positioning said bottom wall in abutting relationship to said side walls, welding said bottom wall to said side walls with straight line welds, and welding end walls to the structure thus formed to enclose the ends of the tank.

3. Method of making a complete generally cylindrical curved sheet metal wall tank comprising the steps of assembling together relatively small area rectangular flat sheets of metal in co-planar relation with adjacent edges in butting relationship, then joining the edges of said flat sheets by straight line submerged arc welding to form a plurality of relatively large area flat sheet metal blanks, bending said blanks to form portions of said cylindrical curved wall, each one of said portions having two longitudinally extending straight edges, one of said portions forming a top wall of said tank, a second one of said portions forming a bottom wall of said tank, third and fourth ones of said portions forming separate side walls of said tank, bending marginal portions of said bottom wall parallel to the longitudinally extending edges thereof outwardly with respect to the cylindrical curvature thereof to form flanges thereon, the junctures of said flanges with the cylindrically curved portion of said bottom wall lying along the longitudinally extending straight edges thereof, positioning said side walls in abutting relationship to opposite longitudinally extending edges of said top wall, welding said side walls to said top wall with straight line welds, positioning said bottom wall with the longitudinal straight edges thereof abutting said side walls and said flanges projecting outwardly, welding said bottom wall to said side walls with straight line welds extending along the longitudinal edges of the bottom wall, and welding end walls to the structure thus formed to enclose the ends of the tank.

4. Method of making a complete generally cylindrical curved sheet metal wall tank comprising the steps of assembling together relatively small area rectangular flat sheets of metal in co-planar relation with adjacent edges in butting relationship, then joining the edges of said flat sheets by straight line submerged arc welding to form a plurality of relatively large area flat sheet metal blanks, bending said blanks to form portions of said cylindrical curved wall, each one of said portions having two longitudinally extending straight edges, one of said portions forming a top wall of said tank, a second one of said portions forming a bottom wall of said tank, third and fourth ones of said portions forming separate side walls of said tank, bending marginal portions of said bottom wall parallel to the longitudinally extending edges thereof outwardly with respect to the cylindrical curvature thereof to form flanges thereon, the junctures of said flanges with the cylindrically curved portion of said bottom wall lying along the longitudinally extending straight edges thereof, bending marginal portions of said top wall parallel to the longitudinally extending edges thereof outwardly with respect to the cylindrical curvature thereof to form flanges thereon, the junctures of said last-mentioned flanges with the cylindrically curved portion of said top wall lying along the longitudinally extending straight edges thereof, positioning said side walls in abutting relationship to opposite longitudinally extending edges of said top wall, welding said side walls to said top wall with straight line welds, positioning said bottom wall with the longitudinal straight edges thereof abutting said side walls and said flanges projecting outwardly, welding said bottom wall to said side walls with straight line welds extending along the longitudinal edges of the bottom wall, and welding end walls to the structure thus formed to enclose the ends of the tank.

References Cited in the file of this patent

UNITED STATES PATENTS

| | | |
|---|---|---|
| 1,798,190 | Carter | Mar. 31, 1931 |
| 1,965,736 | Dillman | July 10, 1934 |
| 2,097,113 | Bradley | Oct. 26, 1937 |
| 2,199,737 | Bernstein | May 7, 1940 |
| 2,301,061 | Logeman | Nov. 3, 1942 |
| 2,684,528 | Rossheir | July 27, 1954 |

FOREIGN PATENTS

| | | |
|---|---|---|
| 736,757 | Great Britain | Sept. 14, 1955 |